United States Patent
Gelmont et al.

(10) Patent No.: US 10,227,531 B2
(45) Date of Patent: *Mar. 12, 2019

(54) PREPARATION OF BROMINE-CONTAINING POLYMERS AND THEIR APPLICATION AS FLAME RETARDANTS

(71) Applicant: Bromine Compounds Ltd., Beer Sheva (IL)

(72) Inventors: Mark Gelmont, Haifa (IL); Michael Yuzefovich, Haifa (IL); David Yoffe, Haifa (IL); Renata Yelizarov, Kiryat Yam (IL); Ron Frim, Haifa (IL); Lior Melamed, Beer Sheva (IL)

(73) Assignee: Bromine Compounds Ltd., Beer Sheva (IL)

( * ) Notice: Subject to any disclaimer, the term of this patent is extended or adjusted under 35 U.S.C. 154(b) by 4 days.

This patent is subject to a terminal disclaimer.

(21) Appl. No.: 15/323,869

(22) PCT Filed: Jul. 7, 2015

(86) PCT No.: PCT/IL2015/050700
§ 371 (c)(1),
(2) Date: Jan. 4, 2017

(87) PCT Pub. No.: WO2016/005973
PCT Pub. Date: Jan. 14, 2016

(65) Prior Publication Data
US 2017/0145313 A1    May 25, 2017

Related U.S. Application Data

(60) Provisional application No. 62/021,722, filed on Jul. 8, 2014.

(51) Int. Cl.
| | |
|---|---|
| C09K 21/14 | (2006.01) |
| C08F 8/22 | (2006.01) |
| C08F 8/24 | (2006.01) |
| C08G 65/48 | (2006.01) |
| C08L 77/06 | (2006.01) |
| C08L 23/14 | (2006.01) |
| C09K 21/02 | (2006.01) |
| C08K 3/22 | (2006.01) |
| C08K 5/00 | (2006.01) |
| C08K 5/098 | (2006.01) |
| C08K 7/14 | (2006.01) |
| C08L 27/10 | (2006.01) |
| C08L 27/24 | (2006.01) |

(52) U.S. Cl.
CPC ............ *C09K 21/14* (2013.01); *C08F 8/22* (2013.01); *C08F 8/24* (2013.01); *C08G 65/485* (2013.01); *C08K 3/2279* (2013.01); *C08K 5/005* (2013.01); *C08K 5/098* (2013.01); *C08K 7/14* (2013.01); *C08L 23/14* (2013.01); *C08L 27/10* (2013.01); *C08L 27/24* (2013.01); *C08L 77/06* (2013.01); *C09K 21/02* (2013.01); *C08L 2201/02* (2013.01)

(58) Field of Classification Search
CPC .............................. C08G 61/10; C09K 21/14
USPC .................................... 528/397, 394
See application file for complete search history.

(56) References Cited

U.S. PATENT DOCUMENTS

| | | |
|---|---|---|
| 3,331,797 A | 7/1967 | Kopetz et al. |
| 3,658,634 A | 4/1972 | Yanagi et al. |
| 3,821,320 A | 6/1974 | Mark et al. |
| 3,899,466 A | 8/1975 | Dubeck et al. |
| 3,962,164 A | 6/1976 | Praetzel et al. |
| 4,119,612 A | 10/1978 | Vollkommer et al. |
| 4,376,837 A | 3/1983 | Jenkner et al. |
| 4,525,513 A | 6/1985 | Hochberg et al. |
| 6,028,156 A | 2/2000 | Peled et al. |
| 6,063,852 A | 5/2000 | Hussain |
| 6,503,988 B1 | 1/2003 | Kitahara et al. |
| 7,601,774 B2 | 10/2009 | Kornberg et al. |
| 9,481,621 B2 | 11/2016 | Gelmont et al. |
| 9,988,332 B2 * | 6/2018 | Gelmont et al. ........ C07C 41/14 528/394 |
| 2007/0205403 A1 | 9/2007 | Kornberg et al. |
| 2007/0257241 A1 | 11/2007 | Kornberg et al. |

FOREIGN PATENT DOCUMENTS

| | | |
|---|---|---|
| CN | 101511927 A | 8/2009 |
| CN | 102165000 A | 8/2011 |

(Continued)

OTHER PUBLICATIONS

Search Report in CN Application No. 201580035498.8 dated Jun. 21, 2018, 2 pages.
U.S. Appl. No. 15/284,596, filed Oct. 4, 2016.
International Search and Written Opinion of PCT/IL2015/050700 dated Oct. 26, 2015.

*Primary Examiner* — Duc Truong
(74) *Attorney, Agent, or Firm* — Marshall, Gerstein & Borun LLP

(57) ABSTRACT

The invention provides a process for preparing bromine-containing polymers, comprising a Friedel-Crafts alkylation reaction of pentabromobenzyl halide with a polymer reactant which contains one or more six-membered aromatic ring(s) in its repeat unit, in the presence of at least one Friedel-Crafts catalyst. The so-formed bromine-containing polymers, having pendent —$CH_2C_6Br_5$ groups attached to at least a portion of the six-membered aromatic rings of the polymer, with a carbon ring atom of said six-membered aromatic ring being bonded to the aliphatic carbon of said —$CH_2C_6Br_5$ pendent group, are also provided. These bromine-containing polymers are useful as flame retarding agents.

13 Claims, No Drawings

(56) References Cited

FOREIGN PATENT DOCUMENTS

| | | |
|---|---|---|
| CN | 102639569 A | 8/2012 |
| DE | 2527802 | 12/1976 |
| DE | 2636027 A1 | 2/1978 |
| DE | 3320333 C1 | 1/1984 |
| EP | 47866 | 8/1981 |
| EP | 0305196 A2 | 3/1989 |
| EP | 481126 | 12/1990 |
| JP | 47032298 | 8/1972 |
| WO | WO-2006013554 A1 | 2/2006 |
| WO | WO-2007/057900 A2 | 5/2007 |
| WO | WO-2010/010561 A1 | 1/2010 |
| WO | WO-2011/069983 A1 | 6/2011 |
| WO | WO-2012127463 A1 | 9/2012 |
| WO | WO-2013054325 | 4/2013 |
| WO | WO-2014061010 A1 | 4/2014 |
| WO | WO-2014106841 A1 | 7/2014 |
| WO | WO-2016005978 A1 | 1/2016 |

\* cited by examiner

PREPARATION OF BROMINE-CONTAINING POLYMERS AND THEIR APPLICATION AS FLAME RETARDANTS

The present invention provides a novel class of high molecular weight polymers having pendent pentabromobenzyl groups, which are suitable for use as flame retardants in flammable materials (e.g., polyamide, polypropylene and acrylonitrile-butadiene-styrene compositions).

Brominated compounds are known to be highly effective as flame retardants, and in many cases they constitute the only viable option for reducing the fire risk of synthetic materials. There exists a need to develop new, polymeric high molecular weight, brominated flame retardants. It is postulated that the higher the molecular weight of the brominated flame retardant, the lower is its volatility and its ability to bio-accumulate in living tissues.

Low molecular weight compounds containing a pentabromobenzyl moiety are known in the art. Pentabromobenzyl acrylate (EP 481126), pentabromobenzyl terephthalate (DE 33 20 333) and pentabromobenzyl tetrabromophthalate (EP 47866) have been reported to be useful in flame retarded polymer compositions. Furthermore, poly (pentabromobenzyl acrylate) is used as a flame retardant agent in flammable materials. Hereinafter, the pentabromobenzyl group is sometimes described by its molecular structure:

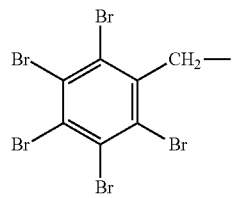

or its molecular formula —$CH_2C_6Br_5$.

In a co-assigned international patent application PCT/IL2014/000002 (≡WO 2014/106841), the use of pentabromobenzyl halide as alkylating reagent in Friedel-Crafts alkylation reaction of low molecular weight aromatic compounds such as alkyl-substituted benzene (e.g., toluene, xylene, ethylbenzene) and diphenylalkane has been illustrated.

We have now found that the —$CH_2C_6Br_5$ group can be incorporated into aromatic rings-containing polymers via a synthetic pathway based on an electrophilic aromatic C-alkylation (also known as Friedel-Crafts alkylation), to produce bromine-rich polymers useful as flame retardants. The present invention thus provides a polymer comprising six-membered aromatic rings, either in the form of side chains (like in polystyrene) or as part of its backbone chain (like in poly (phenylether)), characterized in that pendent —$CH_2C_6Br_5$ groups are attached to at least a portion of said six-membered aromatic rings of the polymer, with a carbon ring atom being bonded to the aliphatic (benzylic) carbon of said —$CH_2C_6Br_5$ pendent group. The pentabromobenzyl group-containing polymers of the invention have high molecular weight, preferably not less than 1,800, e.g., not less than 3,500 (e.g., >6,000), their bromine content is preferably not less than 60%, they are insoluble in water and they are also quite stable against hydrolysis and/or decomposition.

It should be noted that the invention pertains also to copolymers having two or more different types of repeat units, provided, of course, that at least one of said repeat units contains an aromatic ring with a —$CH_2C_6Br_5$ pendent group bonded through its benzylic carbon to a carbon atom of the aromatic ring in said at least one repeat unit.

The polymers of the invention fall into two broad categories: (I) polymers where the aromatic rings (bearing the —$CH_2C_6Br_5$ moiety) constitute side groups, and (II) polymers where the aromatic rings (bearing the —$CH_2C_6Br_5$ groups) constitute part of the polymer backbone chain, as illustrated more specifically by Formulas I and II, respectively:

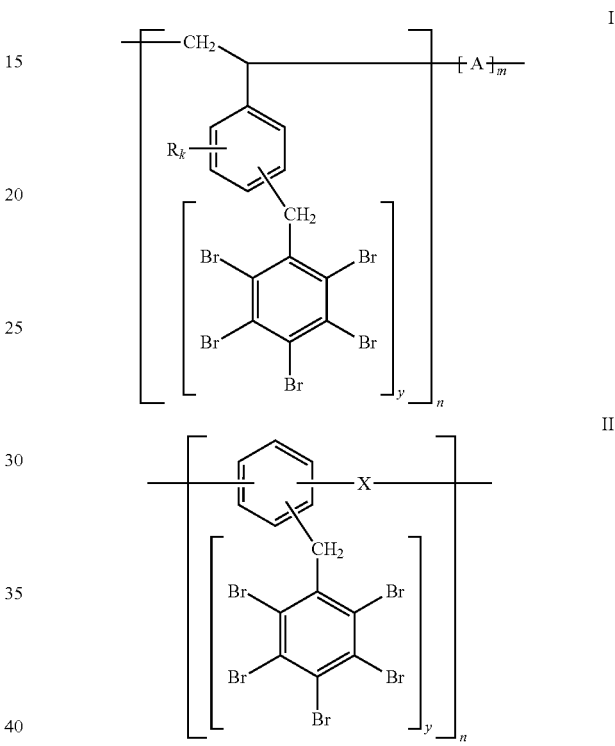

In the polymer of Formula I, the benzene ring bearing —$CH_2C_6Br_5$ group(s) constitutes a side group; R is Br or a linear or branched aliphatic chain, k is independently an integer from 0 to 4, preferably 0 or 1, y is an integer from 1 to (5-k), A=null, ethylene —$CH_2CH_2$—, butylene —$CH_2CH=CHCH_2$—; propylene —$CH(CH_3)CH_2$—; isoprene —$CH_2$—$CH=C(CH_3)CH_2$—, and n and m are the number of units in the polymer chain (e.g., in Formula I, 3≤b≤1000 and m=0 or 0.1n≤m≤0.8n; in Formula II, 3≤n≤1000).

In the polymer of Formula II, the benzene ring bearing —$CH_2C_6Br_5$ group(s) constitutes part of the backbone chain; X=null, O, S, $CH_2$, $CH_2CH_2$, and n is the number of units in the polymer chain.

It should be noted that the representation of the polymers of the invention by the conventional notation —[—B—]-n is not intended to imply that each and every unit in the polymer contains a pendent —$CH_2C_6Br_5$ group.

The polymer compounds of the invention are prepared by reacting pentabromobenzyl halide, especially pentabromobenzyl bromide (chemically named 1-(bromomethyl)-2,3,4,5,6-pentabromobenzene and abbreviated herein PBBBr) with a polymer starting material which comprises at least one six-membered aromatic ring in its repeat unit, as set out above, in the presence of a suitable Friedel-Crafts catalyst (Lewis acids) such as $AlCl_3$, $AlBr_3$, $GaCl_3$, $FeCl_3$, $SnCl_4$, $SbCl_3$, $ZnCl_2$, $CuCl_2$ and HF, or a mixture thereof. The use of $AlCl_3$, either alone or in combination with one or more other catalysts, especially $SnCl_4$, is preferred. For example, a mixture consisting of $AlCl_3$ and $SnCl_4$, in 1:3-3:1 molar ratio, e.g., around 1:1, has been successfully used to catalyze the reaction.

Thus, another aspect of the invention is a process for preparing bromine-containing polymers, comprising a Friedel-Crafts alkylation reaction of pentabromobenzyl halide ($HalCH_2C_6Br_5$, wherein Hal indicates halide such as chloride or bromide) with a polymer reactant having one or more six-membered aromatic ring(s) in its repeat unit, wherein said reaction takes place in a solvent in the presence of at least one Friedel-Crafts catalyst. The so-formed products (Formulas I and II) are characterized by the presence of bonds between carbon ring atoms of the aromatic rings of the polymer, and the benzylic carbon of the pentabromobenzyl groups.

Regarding the pentabromobenzyl bromide starting material, it is commercially available (e.g., from ICL-IP) or it can be prepared by methods known in the art (e.g., U.S. Pat. No. 6,028,156 and U.S. Pat. No. 7,601,774), according to a route of synthesis involving the aromatic bromination of toluene, for example in halogenated solvent(s), using elemental bromine, in the presence of a Lewis acid catalyst, e.g. $AlCl_3$, to form pentabromotoluene (abbreviated herein 5-BT), which is then brominated at the benzylic carbon using elemental bromine and a radical source e.g. azobisisobutyronitrile, as illustrated by the following scheme (see U.S. Pat. No. 7,601,774):

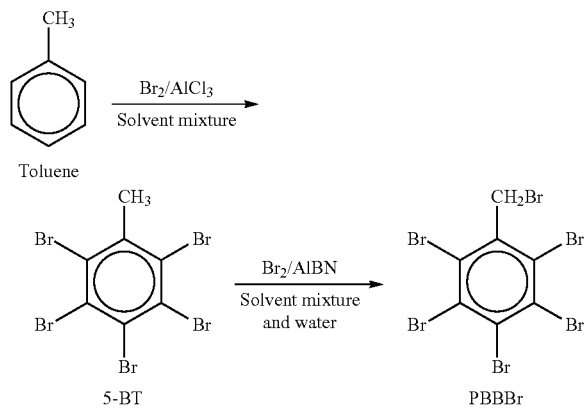

Regarding the starting material which undergoes the aromatic substitution reaction, namely, electrophilic aromatic C-alkylation according to the invention, it is a polymer comprising an aromatic ring in its repeat unit (or in at least one of its repeat units, in the case of a copolymer starting material). Preferably, the polymer starting material is represented by formulas III or IV:

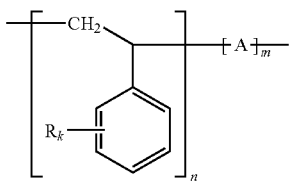

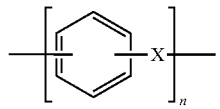

In Formula III, R is a linear or branched aliphatic chain or bromine, k is independently an integer from 0 to 4, preferably 0 or 1, A=null, ethylene —$CH_2CH_2$—, butylene —$CH_2CH$=$CHCH_2$—; propylene —$CH(CH_3)CH_2$—; or isoprene —$CH_2$—$CH$=$C(CH_3)CH_2$—, n and m are the number of repeat units in the polymer chain.

In formula IV, X=null, O, S, $CH_2$, $CH_2CH_2$, and n is the number of repeat units in the polymer chain.

Exemplary starting materials of formula III include:
Polystyrene, where k=0, A=null and m=0;
Styrene copolymers, such as poly(styrene-co-ethylene), where k=0 and A is —$CH_2CH_2$—; poly(styrene-co-butadiene), where k=0 and A is —$CH_2CH$=$CHCH_2$—, (CAS 9003-55-8); and poly(styrene-co-isoprene), where k=0 and A is —$CH_2$—$CH$=$C(CH_3)CH_2$—, (CAS 250038-32-8).

Exemplary starting materials of formula IV include poly (phenyl ether), where X=O.

The Friedel-Crafts alkylation reaction according to the invention takes place in a solvent or in a mixture of solvents, e.g., in a halogenated aliphatic hydrocarbon which is preferably selected from the group consisting of dichloromethane (DCM), dibromomethane (DBM), bromochloromethane and dichloroethane (DCE). The molar ratio between the polymer starting material and $HalCH_2C_6Br_5$ is suitably adjusted to satisfy the desired degree of substitution on the aromatic ring(s) of said polymer starting material. In general, it is desired to attach not less than one —$CH_2C_6Br_5$ group to each six-membered aromatic ring present in the polymer starting material. The amount of the catalyst, e.g. $AlCl3$ or a mixture of catalysts, is preferably between 0.5% wt/wt and 2% wt/wt relative to the $HalCH_2C_6Br_5$ (e.g., PBBBr amount). The reaction is run under anhydrous conditions.

A reaction vessel is charged with a solvent, the polymer starting material (e.g., polystyrene), $HalCH_2C_6Br_5$ (e.g., PBBBr) and the catalyst(s). The reactants are dissolved under heating, following which the catalyst is added. The polymer starting material and $HalCH_2C_6Br_5$ may be fed either simultaneously or successively to the reaction mixture. For example, in some cases it may be more expedient first to dissolve the polymer starting material in the solvent, and on formation of a clear solution, to proceed with the addition of the $HalCH_2C_6Br_5$ (e.g., PBBBr) to the solution, or addition of the polymer solution to the $HalCH_2C_6Br_5$. The reaction reaches completion at a temperature of not less 40° C., e.g. from 40° C.-90° C., more specifically from 60° C.-90° C. In general, the reaction time is from 2 to 8 hours. The Friedel-Crafts alkylation reaction is accompanied by the generation of hydrogen bromide. The end of the reaction is indicated by either the complete consumption of the PBBBr (its disappearance can be determined by gas chromatography analysis) or by the cessation of hydrogen bromide evolution.

The product is isolated from the reaction mixture by means of conventional techniques. The reaction mixture is repeatedly washed with water, aqueous sodium bisulfite (SBS) or alkaline solutions (e.g., sodium carbonate or sodium hydrogen carbonate), whereby excess catalyst is destroyed. In the event that the polymer product does not spontaneously precipitate from the halogenated aliphatic hydrocarbon reaction solvent, then its precipitation can be induced by combining the reaction mixture with a non-solvent i.e., a solvent in which the product is essentially insoluble. Polar solvents such as acetone and lower alcohols such as isopropanol, which are sufficiently miscible with halogenated aliphatic hydrocarbon, are useful as non-solvents. On cooling, the polymer product precipitates from mixtures of halogenated aliphatic hydrocarbon and acetone or isopropanol. The polymer product is collected by filtration, and optionally washed and dried.

The invention also relates to the use of pentabromobenzyl halide $HalCH_2C_6Br_5$ (e.g., PBBBr) as an alkylation reagent in a Friedel-Crafts alkylation of a polymer having an aromatic ring-containing repeat unit, such as those identified by Formulas III and IV. Preferred polymers starting materials are polystyrene grades with weight average molecular weight from 170000 to 350000 and polyphenylether grades with weight average molecular weight from 400 to about 350000.

In a preferred embodiment, the invention provides a process comprising charging a reaction vessel with a solvent (e.g., halogenated aliphatic hydrocarbon), a polymer starting material selected from the group consisting of polystyrene and poly(phenylether), pentabromobenzyl halide $HalCH_2C_6Br_5$ (e.g., PBBBr) and one or more catalysts used for Friedel-Crafts alkylation, allowing the Friedel-Crafts alkylation to reach completion and recovering bromine-containing polymer product, i.e., with pendent $—CH_2C_6Br_5$ groups. Preferably, the number of moles of $HalCH_2C_6Br_5$ used is the reaction is not less than the total number of moles of the aromatic rings in the polymer starting material. For example, if a grade of polystyrene with an weight average molecular weight of about 200,000 is used, then the average number of repeat units in the polymer chain is approximately 2000 (as the molecular weight of the repeat unit of polystyrene is around 100). Thus, not less than one mol of $HalCH_2C_6Br_5$ would be used per 0.0005 mol of the polystyrene starting material.

Preferred bromine-containing polymers of the invention are those of Formula I, with k=0, m=0 and y=1, as represented by Formula V:

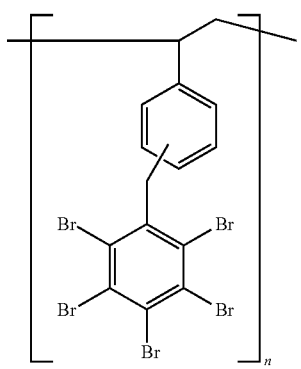

Formula V

Pentabromobenzyl-substituted polystyrene provided by the invention is characterized by bromine content of not less than 60%, e.g., from 65 to 70% by weight. The thermal stability profile of preferred pentabromobenzyl-substituted polystyrene of the invention, as indicated by thermogravimetric analysis (TGA), which measures the weight loss of a sample as sample temperature is increased, is typically as follows:

|  | temperature | | |
| --- | --- | --- | --- |
|  | T1 ≥ 360° C. | T2 ≥ 370° C. | T3 ≥ 380° C. |
| % weight loss | 2.0 | 5.0 | 10.0 |

Other preferred bromine-containing polymers of the invention are those of Formula II, with X=O and y=2, as shown by Formula VI:

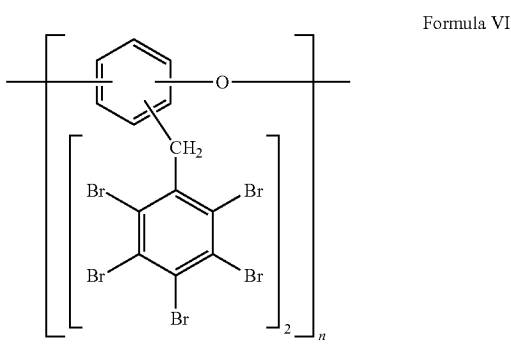

Formula VI

Pentabromobenzyl-substituted polyphenylether provided by the invention is characterized by bromine content of not less than 70% e.g., from 70 to 75% by weight. The thermal stability profile of preferred pentabromobenzyl-substituted polyphenylether of the invention is typically as follows:

|  | temperature | | |
| --- | --- | --- | --- |
|  | T1 ≥ 345° C. | T2 ≥ 355° C. | T3 ≥ 365° C. |
| % weight loss | 2.0 | 5.0 | 10.0 |

Especially preferred bromine-containing polymer of the invention is pentabromobenzyl-substituted polystyrene with bromine content from 65 to 70% by weight, showing 5% weight loss at a temperature equal to or higher than 370° C. (preferably >375° C.) and/or 10% weight loss at a temperature higher than 380° C. (preferably >385° C.), when subjected to TGA at heating rate of 10° C./min. Bromine content of the product is measured by the Parr Bomb method, involving the decomposition of bromine-containing organic compounds to give bromides, followed by argentometric titration, as described further below. The experimental results reported below indicate that pentabromobenzyl-substituted polystyrene is successfully added to plastic materials to reduce their flammability.

It is possible to incorporate additional bromine atoms into the polymers of the invention by subjecting the bromine-containing polymers produced by the Friedel-Crafts alkylation to a bromination reaction (e.g., with elemental bromine). One specific embodiment of the invention is therefore concerned with a process for preparing bromine-containing polymers, comprising:

(i) a Friedel-Crafts alkylation reaction of pentabromobenzyl halide with a polymer reactant having one or more six-membered aromatic ring(s) in its repeat unit, wherein said reaction takes place in a solvent in the presence of at least one Friedel-Crafts catalyst, to obtain pentabromobenzyl-substituted polymer; and (ii) subjecting the so-formed pentabromobenzyl-substituted polymer to bromination reaction.

The bromination reaction may also take place in halogenated hydrocarbon, or a mixture of halogenated hydrocarbons, such as those used for the alkylation reaction. The reaction vessel is charged with the solvent(s) and pentabromobenzyl-substituted polymer (e.g., pentabromobenzyl-substituted polystyrene). Elemental bromine and a suitable catalyst (e.g., one or more Lewis acid catalysts as identified above, especially $AlCl_3$ and mixtures thereof with other catalysts) are charged to the reaction vessel. Elemental bromine is gradually added to the reaction vessel in an amount sufficient to provide the degree of bromination sought, e.g., one or two bromine atoms per aromatic ring in the polymer. The completion of the bromination reaction is indicated by the cessation of the HBr evolution. The product is recovered by conventional methods. In this way it is possible to produce bromine-containing polymer of Formula I, with the benzene rings bearing —$CH_2C_6Br_5$ group(s) and also bromine atoms (i.e., R is Br and k=1 or 2), with bromine content exceeding 70% (from 70 to 75% by weight).

Thus, the bromine-rich polymers of the invention are useful as flame retardant agents in a flammable material. Accordingly, another aspect of the present invention is a flame-retarded composition which comprises a flammable material and the novel polymer of the invention. For example, the bromine-containing polymers of the invention can be used to reduce the flammability of polyamide, polypropylene and acrylonitrile-butadiene-styrene (ABS).

A flame-retarded composition of the invention comprises an effective flame-retarding amount of the novel bromine-containing polymer of the invention, e.g., the compounds of Formula I and II, and specifically, V and VI. The concentration the bromine-containing polymer of the invention in the plastic formulation is adjusted to secure a bromine content of least 5 wt %, and preferably at least 10 wt %, for example, from 10 to 25% by weight, and more specifically, from 10 to 20% by weight (relative to the total weight of the flame-retarded plastic formulation).

Other conventional additives may also be included in the formulation. For example, an inorganic compound (typically a metal oxide) capable of cooperating with the novel bromine-containing polymer is preferably also incorporated into the formulation. A preferred example of a suitable inorganic compound, which is generally considered as an "inorganic synergist", is antimony trioxide.

Specifically, the novel bromine-containing polymers of the invention display good activity in polyamide. Polyamide-based composition of the invention comprises at least 30% polyamide, e.g., between 40% and 70% wt %. The polyamide formulation further comprises reinforcing fillers, namely, glass fibers, which are typically pre-coated prior to their use by methods known in the art in order to improve their compatibility with the polyamide matrix. Such modified forms of glass fibers are available in the market, e.g., GF Chop Vantage 3660 from PPG. The glass fibers comprise filaments with diameters in the range from 2µ to 20µ, and are applied in the form of pieces with lengths in the range from 2 to 10 mm, e.g., from 3 to 4.5 mm. For example, the major constituents of glass fibers applied for reinforcing polyamide are alumino-borosilicates; such a type of glass is known as E-glass. The concentration of the glass fibers is from 5% to 40% of the total weight of the polyamide composition.

In addition to the polyamide, the reinforcing fillers, the bromine-containing polymer (e.g., compounds of Formula I or II) and antimony trioxide, the polyamide formulation of this invention may further contain lubricants, antioxidants (e.g., of a hindered phenol or phosphite type), pigments, UV stabilizers and heat stabilizers. The concentration of each of the conventional additives listed above is typically between 0.05 and 10 wt %.

The polyamide compositions are produced by melt-mixing the components, e.g., in a co-kneader or twin screw extruder, wherein the mixing temperature is in the range from 200 to 300° C. For example, the polyamide, the bromine containing flame retardant and the conventional additives (with the exception of the glass fibers) are dry blended and the blend is fed to the extruder throat. The glass fibers are the last to be added, i.e., downstream.

Preferred polyamide compositions of the invention comprise 100 parts-by-weight of polyamide (e.g., polyamide 6,6); from 40 to 70 parts-by-weight of glass fibers; from 5 to 50 parts-by-weight of pentabromobenzyl-substituted polystyrene of Formula V; and from 3 to 15 parts-by-weight of an inorganic synergist (e.g., $Sb_2O_3$).

The novel bromine-containing polymers of the invention also demonstrate good activity in reducing the flammability of polypropylene. Polypropylene composition of the invention preferably comprises a polypropylene copolymer in an amount of not less than 50 wt % (relative to the total weight of the composition), e.g., from 50 to 85 wt %, more specifically from 50 to 70 wt %. Suitable polypropylene impact copolymers which can be used in the present invention can be in the form of block copolymers comprising a first block (or phase), which is essentially the polypropylene homopolymer component and a second block (or phase), which is an ethylene-propylene copolymer component. A polypropylene impact copolymer is produced by means of sequential polymerization reactions under conditions known in the art. The first reaction produces the homopolymer component and the second reaction produces the copolymer component. Thus, the copolymer component is chemically incorporated within the matrix of the homopolymer component. Different grades of polypropylene impact copolymers in the form of block copolymers are commercially available (Carmel Olefins, Israel, under the name Capilene® SE 50E, TR 50 and SL 50). Impact modified polypropylenes can be prepared by admixing a polypropylene homopolymer and a rubber. The compounds of the invention can be used to reduce the flammability of either filler-free or filler-containing polypropylene-based formulations.

Preferred polypropylene compositions of the invention comprise 100 parts-by-weight polypropylene copolymer; from 5 to 50 parts-by-weight pentabromobenzyl-substituted polystyrene of Formula V and from 2 to 20 parts-by-weight of an inorganic synergist (e.g., $Sb_2O_3$). Filler-containing polypropylene further comprises from 5 to 25 parts-by-weight talc, added either in a powder form or in the form of masterbatch pellets.

ABS compositions of the invention preferably comprise not less than 50 wt % ABS (relative to the total weight of the formulation), e.g., from 50 to 85 wt % ABS. The term ABS refers in the context of the present invention to copolymers and terpolymers that include the structural units corresponding to (optionally substituted) styrene, acrylonitrile and butadiene, regardless of the composition and method of production of said polymers. Characteristics and compositions of ABS are described, for example, in the Encyclopedia of Polymer Science and Engineering, Volume 16, pages 72-74 (1985). ABS with MFI between 1 and 50 g/10 min (measured according to ISO 1133 at 220° C./10 kg) are used.

The ABS formulation according to the present invention also includes one or more anti-dripping agents such as polytetrafluoroethylene (abbreviated PTFE) in a preferred amount between 0.025 and 0.4 wt %, more preferably between 0.025 and 0.3 wt %, and even more preferably between 0.05 and 0.2 wt %. PTFE is described, for example, in U.S. Pat. No. 6,503,988.

The plastic formulations set forth above are readily prepared by methods known in the art. The various ingredients of the formulation are blended together, according to their respective amounts. The ingredients may be first dry blended using suitable mixing machines, such as Henschel mixer. The resulting mixture may then be processed and compounded to form homogeneous pellets, for example, by using a twin screw extruder. The pellets obtained are dried, and are suitable for feed to an article shaping process such as injection molding. Other blending and shaping techniques can also be applied. Articles molded from the polymer formulations form another aspect of the invention.

EXAMPLES

Methods

The TGA analysis was performed by a Mettler-toledo instrument model 850. ~10 mg sample were heated in aluminum oxide crucible from 35° C. to about 700° C. with heating rate of 10° C./min in nitrogen atmosphere.

Bromine content of the compounds is measured by the Parr Bomb method. The sample (~0.08-0.12 g) is placed in a peroxide bomb vessel. Sucrose (0.5 g) is added and the full dipper of sodium peroxide is also added. The sample is subjected to oxidizing with sodium peroxide while a burner flame is applied to the bottom of the bomb; the bomb is heated up to about 200° C. and the burner is then turned off. The bomb is placed in cold water (2 liters). Gaseous products are absorbed by the alkaline mixture and are retained within the bomb, mostly in the form of sodium bromide. The content of the bomb is then combined with warm water. Hydrazine sulfate is added to destroy residual sodium peroxide. Nitric acid is added in portions, until the solution is completely neutralized and becomes acidic. The solution is cooled to room temperature and then subjected to titration with $AgNO_3$ (0.1 N) to determine bromine content.

Example 1

Reaction of Polystyrene with PBBBr Using $AlCl_3$ and $SnCl_4$

DBM (1.8 L) and polystyrene with MW of 170000-350000 (104.15 g) were placed in a 2 L reactor fitted with a mechanical stirrer, thermometer, condenser, HBr trap and $N_2$ inlet. The mixture was heated to 66° C. to give a clear solution. PBBBr (565.5 g) was then dissolved in the solution. $AlCl_3$ (3.1 g) and $SnCl_4$ (4.8 g) were added and the mixture was heated to 84° C., following which the vigorous evolution of HBr started. The mixture was heated at 80° C. for about 6 hours until the PBBBr disappeared (by GC or HPLC). The reaction mixture was washed three times: with water (1.5 L), saturated $NaHCO_3$ solution (1.5 L) to give pH=7, and again with water (1.5 L), taking 30 minutes for each washing. After that, the reaction mixture was added dropwise to acetone (6 L) to induce precipitation. The reaction mixture was cooled to 20° C. and the solid was filtered off and dried in an oven at 105° C. under reduced pressure for 12 hours, to give 509 g, corresponding to an ~86% yield, based on PBBBr. According to elemental analysis, the content of bromine is about 68%, corresponding to about one PBBBr molecule per aromatic ring. The TGA profile of the product is tabulated below:

|  | Temperature | | |
|---|---|---|---|
|  | T1 = 365° C. | T2 = 381° C. | T3 = 391° C. |
| % weight loss | 2.0 | 5.0 | 10.0 |

Example 2

Reaction of Polystyrene with PBBBr Using $AlCl_3$

The procedure of Example 1 was repeated, but using PBBBr (27.1 g), polystyrene (10.0 g), $AlCl_3$ (0.2 g) and dichloroethane (100 ml) as the solvent. The weight of the product was 24.0 g, corresponding to ~72% yield, based on PBBBr. The content of bromine is about 60.0%.

Example 3

Reaction of Polyphenylether with PBBBr

Polyphenylether [Santovac 7, available from Santolubes LLC, MW~450 (30 g)], PBBBr (366.4 g) and DBM (700 ml) were placed in a 1 L reactor fitted with a mechanical stirrer, thermometer, condenser, HBr trap and $N_2$ inlet. The mixture was heated to 70° C. and $AlCl_3$ (3.5 g) was added by portions. The mixture was stirred at 90° C. until the PBBBr disappeared (5-6 h). The reaction mixture was washed at 50° C. with water (250 ml) and SBS (2.5 ml, ~28%), water (250 ml), 5% $Na_2CO_3$ (250 ml) and water (250 ml), taking 20 minutes for each washing. The solvent (~150 ml) was evaporated under reduced pressure. The remainder, heated at 40-50° C., was added dropwise to IPA (450 ml) at 50° C., over 1 h, under vigorous stirring. The mixture was stirred at 50° C. for 1 h then cooled to 18° C. The solid was filtered off and washed with IPA (150 ml) on the filter. The solid was dried in the oven at 105° C., and at 150° C. under reduced pressure, for 3 and 7 hours respectively, to give a white powder product (318 g, corresponding to ~92% yield, based on PBBBr). The content of bromine is about 75.0%. The TGA profile of the product is tabulated below:

|  | Temperature | | |
|---|---|---|---|
|  | T1 = 351° C. | T2 = 368° C. | T3 = 375° C. |
| % weight loss | 2.0 | 5.0 | 10.0 |

Example 4

Bromination of the Product from Example 1

DBM/DCM (1495 g/96 g) and product of Example 1 (191.3 g) were placed in a 2 L reactor fitted with a mechanical stirrer, a dropping funnel, thermometer, condenser, HBr trap and $N_2$ inlet. The mixture was heated to 60° C. to give a clear solution. $Br_2$ (38.2 g) was then added dropwise to the solution over 0.5 h. $AlCl_3$ (1.0 g) and $SnCl_4$ (2.0 g) were added and the mixture was heated to 65° C. and additional $Br_2$ (76.4 g) was added dropwise, following which the vigorous evolution of HBr started. The mixture was heated at 65° C. for about 6 hours until the HBr evaluation was observed (by titration). The reaction mixture was washed: with water (1.0 L), saturated $NaHCO_3$ solution (1.0 L) and again with water (1.0 L) to give pH=7, taking 30 minutes for each washing.

After that, the reaction mixture was added dropwise to isopropanol (1.5 L) to induce precipitation. The reaction mixture was cooled to 20° C. and the solid was filtered off and dried in an oven at 105° C. under reduced pressure for 12 hours, to give 218 g, corresponding to an ~89% yield.

According to analysis, the content of bromine is about 72%, corresponding to about two bromine atoms per aromatic ring. The TGA profile of the product is tabulated below:

|  | Temperature | | |
| --- | --- | --- | --- |
|  | $T_1 = 267°$ C. | $T_2 = 330°$ C. | $T_3 = 375°$ C. |
| % weight loss | 2.0 | 5.0 | 10.0 |

In the studies reported in the following examples, the ability of pentabromobenzyl-substituted polystyrene of Example 1 to reduce the flammability of different thermoplastics was evaluated. Test specimens were prepared and subjected to the following tests:

Flammability Test

The flammability test was carried out according to the Underwriters-Laboratories standard UL 94, applying the vertical burn on specimens of 0.8 mm or 1.6 mm thickness.

Mechanical Properties

Impact strength was measured using the Izod notched test according to ASTM D-256-81, using pendulum impact tester type 5102 (Zwick).

Tensile properties (tensile strength, tensile modulus, elongation at break) were measured in Zwick 1435 material testing machine according to ASTM D-638-95 (v=5 mm/min).

Other Properties

HDT (heat distortion temperature; this is the temperature at which a polymer sample deforms under a specific load) was measured according to ASTM D-648-72 with load of 1820 kPa and heating rate of 120° C./hour; the instrument is HDT/Vicat-plus from Davenport, Lloyd instruments.

MFI (melt flow index) was determined according to ASTM D1238 (230° C./2.16 kg for PP; 250° C./1.2 kg for polyamide); the instrument is Meltflixer 2000 from Thermo Hake.

Example 5 (Comparative) and Example 6 (of the Invention)

V-0 Rated Polyamide 6,6 Formulation

In this set of examples, pentabromobenzyl-substituted polystyrene of Example 1 was tested to evaluate its ability to reduce the flammability of polyamide 6,6. For the purpose of comparison, corresponding formulation was also prepared, where the flame retarding agent was another bromine-containing polymer (FR-803P; brominated polystyrene commercially available from IC-IP).

Ingredients Used to Prepare the Compositions

The materials employed in the experimental work are set out in Table 1 (the abbreviation "FR" indicates flame retardant):

TABLE 1

| Product (manufacturer) | description | function |
| --- | --- | --- |
| P-50FL (Nilit) | Polyamide 66 | Plastic matrix |
| GF Chop Vantage 3660 (PPG) | Glass fibers | Reinforcing agents |
| FR-803P (ICL-IP) | Brominated polystyrene | FR |
| Product of Example 1 | Pentabromobenzyl-substituted polystyrene | FR |
| AO M-0112 (Kafrit) | Antimony trioxide masterbatch which contains 80% by weight $Sb_2O_3$ | FR-synergist |
| Ca stearate (Ciba) | Calcium Stearate | Lubricant |
| Acrawax C (Lonza) | Nitrogen-containing, hindered phenol | Antioxidant & heat stabilizer |
| Irganox 1171B (Ciba) | N,N' ethylene bisstearamide | Antioxidant & heat stabilizer |

Preparation of Polyamide Compositions and Test Specimens

The ingredients were compounded in a twin-screw co-rotating extruder (Berstorff ZE25) with L/D=32. The polyamide, the bromine-containing flame retardant and all other additives—with the exception of glass fibers—were weighed and mixed, and the resultant blend was fed into the main feeding port of the extruder. The glass fibers were fed into the fifth section of the extruder via lateral side feeding. A set temperature profile of 250-260-265-265-265-270-275-280° C. was employed. The screw speed was 350 rpm, and the feeding rate was 12 kg per hour.

The extrudates obtained were pelletized in pelletizer 750/3 (Accrapac Systems Limited). The resultant pellets were dried in a circulating air oven at 120° C. for four hours and at 80° C. in a vacuum oven overnight.

The dried pellets were injection molded into test specimens using Allrounder 500-150 (Arburg). The conditions of the injection molding are set out in Table 2.

TABLE 2

| PARAMETER | UNITS | Set values |
| --- | --- | --- |
| $T_1$ (Feeding zone) | ° C. | 265 |
| $T_2$ | ° C. | 270 |
| $T_3$ | ° C. | 275 |
| $T_4$ | ° C. | 280 |
| $T_5$ (nozzle) | ° C. | 285 |
| Mold temperature | ° C. | 85 |
| Injection pressure | bar | 1200 |
| Holding pressure | bar | 500 |
| Back pressure | bar | 80 |
| Holding time | sec | 2 |
| Cooling time | sec | 13 |
| Filling volume (portion) | ccm | 19 |
| Injection speed | ccm/sec | 35 |
| Switch over point | [ccm] | 12 |

The specimens produced were conditioned at 23° C. for a week and were then subjected to a series of tests. The compositions produced and the results of the tests are set out in Table 3.

TABLE 3

| | Examples and FR used | |
|---|---|---|
| | Example 5 (comparative) | Example 6 (invention) |
| Composition | | |
| Polyamide 66 (P-50FL) | 43.8 | 44.3 |
| Glass fibers (GF Chop Vantage 3660) | 30.0 | 30.0 |
| Flame retardant (Brominated polystyrene FR-803P) | 19.5 | |
| Flame retardant (Pentabromobenzyl-substituted polystyrene of Example 1) | | 19.1 |
| $Sb_2O_3$ (as M-0112; containing 80% $Sb_2O_3$) | 6.0 | 6.0 |
| Antioxidant & heat stabilizer (Acrawax C) | 0.2 | 0.2 |
| Antioxidant & heat stabilizer (Irganox B1171) | 0.2 | 0.2 |
| Lubricant (calcium stearate) | 0.2 | 0.2 |
| Bromine (calculated wt %) | 13.0 | 13.0 |
| $Sb_2O_3$ (calculated wt %) | 4.8 | 4.8 |
| properties | | |
| Flammability test: UL-94 vertical burning test at 0.8 mm thickness | | |
| Max flaming time (s) | 1 | 1 |
| Total flaming time (s) | 10 | 10 |
| Number of specimens dripped | 5 | 5 |
| Number of specimens igniting cotton | 0 | 0 |
| UL 94 Rating | V-0 | V-0 |
| Mechanical properties | | |
| Izod notched impact (J/m) | 96 | 97 |
| Tensile strength (MPa) | 149 | 137 |
| Tensile modulus (MPa) | 10462 | 10450 |
| elongation at break (%) | 3.7 | 3.5 |

The results set out in Table 3 indicate that pentabromobenzyl-substituted polystyrene and commercial brominated polystyrene show equally good performance as flame retarding agents in polyamide. The flammability and mechanical properties of the exemplified polyamide formulations are comparable.

Example 7-8 (Comparative) and Example 9 (of the Invention)

V-0 Rated Talc-Free Polypropylene Formulations

Pentabromobenzyl-substituted polystyrene of Example 1 was tested to evaluate its ability to reduce the flammability of polypropylene copolymers (talc-free). For the purpose of comparison, two corresponding formulations was prepared, using decabromodiphenyl ethane and poly(pentabromobenzyl acrylate) as flame retarding agents (FR-1410 and FR-1025, respectively; both are commercially available from ICL-IP). Materials used for preparing the compositions are tabulated in Table 4.

TABLE 4

| Material (manufacturer) | GENERAL DESCRIPTION | FUNCTION |
|---|---|---|
| PP Capilene SL-50 (Caol) | polypropylene impact copolymer | plastic matrix |
| FR 1410 | decabromodiphenyl ethane | FR |
| FR 1025 | poly(pentabromobenzyl acrylate) | FR |
| Product of Example 1 | pentabromobenzyl-substituted polystyrene | FR |
| M0112 (Kafrit) | Antimony trioxide masterbatch which contains 80% by weight $Sb_2O_3$ | FR synergist |
| Irganox B 225 (Ciba) | 50% tris(2,4-ditert-butylphenyl)phosphite and 50% pentaerythritol tetrakis[3-[3,5-di-tert-butyl-4-hydroxyphenyl]propionate] | Antioxidant & heat stabilizer. |

Preparation of Polypropylene Compositions and Test Specimens

The compounding was performed in a twin-screw co-rotating extruder ZE25 with L/D=32. Temperature profile of 120-180-200-200-200-210-220-230° C. was employed. The screw speed was 350 rpm, and the feeding rate was 12 kg per hour.

The extrudtaes produced were pelletized in a pelletizer 750/3 from Accrapak Systems Ltd. The resultant pellets were dried in a circulating air oven at 80° C. for 3 hours. The dried pellets were injection molded into test specimens (1.6 mm thick) using Allrounder 500-150 from Arburg as tabulated in Table 5.

TABLE 5

| PARAMETER | UNITS | Set values |
|---|---|---|
| $T_1$ (Feeding zone) | ° C. | 210 |
| $T_2$ | ° C. | 215 |
| $T_3$ | ° C. | 220 |
| $T_4$ | ° C. | 225 |
| $T_5$ (nozzle) | ° C. | 230 |
| Mold temperature | ° C. | 35 |
| Injection pressure | bar | 1300 |
| Holding pressure | bar | 600 |
| Back pressure | bar | 60 |
| Holding time | sec | 7 |
| Cooling time | sec | 13 |
| Filling volume (portion) | ccm | 38 |
| Injection speed | ccm/sec | 35 |

The specimens were conditioned for one week at 23° C., and were subjected to a set of tests. The results are shown in Table 7.

TABLE 7

| | Example | | |
|---|---|---|---|
| | 7 (comparative) | 8 (comparative) | 9 (invention) |
| Composition (by weight %) | | | |
| Polypropylene | 57.4 | 57.4 | 60 |
| FR 1410 | 28 | | |
| FR 1025 | | 28 | |
| product of Example 1 | | | 27.9 |
| $Sb_2O_3$ (as M-0112; containing 80% $Sb_2O_3$) | 14.4 | 14.4 | 11.9 |
| Irganox B 225 | 0.2 | 0.2 | 0.2 |
| Br content, % calculated | 22 | 20 | 19.0 |
| $Sb_2O_3$, % calculated | 11.5 | 11.5 | 9.5 |
| Properties | | | |
| Flammability test: UL-94 vertical burning test at 1.6 mm thickness | | | |
| Maximal flaming time (sec) | 6 | 8 | 9 |
| Total Flaming time (sec) | 17 | 47 | 63 |
| Maximal glow time + second flaming (sec) | 25 | 35 | 3 |
| Number of specimen | 5 | 5 | 5 |
| Number of Specimens dripped | 4 | 0 | 5 |
| Number of cotton ignition | 0 | 0 | 0 |

TABLE 7-continued

| | Example | | |
|---|---|---|---|
| | 7 (comparative) | 8 (comparative) | 9 (invention) |
| Rating | V-0 | V-0 | V-0 |
| Mechanical Properties | | | |
| Impact strength (J/m) | 34 | 29 | 44 |
| Tensile strength (MPa) | 21 | 24 | 20 |
| Elongation at break (%) | 46 | 7 | 61 |
| Tensile modulus (MPa) | 2010 | 1725 | 1478 |
| Other properties | | | |
| HDT (° C.) | 58 | 85 | 62 |
| MFI (gr/10 min) | 4.8 | 7.7 | 4.12 |

The results show that pentabromobenzyl-substituted polystyrene is successfully added to polypropylene copolymer at a relatively low concentration in comparison to other bromine-containing flame retarding agents, to pass the UL-94 V-0 flammability test. Pentabromobenzyl-substituted polystyrene of the invention is able to achieve UL-94 V-0 rating in polypropylene copolymers at a bromine content of 19% by weight, with the aid of 9.5% by weight antimony trioxide. The comparative brominated flame retardants tested require higher bromine and antimony trioxide loading to impart UL-94 V-0 rating to polypropylene copolymers.

Examples 10-12 (of the Invention)

V-1 Rated Talc-Containing Polypropylene Formulations

The aim of this set of examples is to evaluate the ability of pentabromobenzyl-substituted polystyrene of Example 1 to reduce the flammability of talc-containing polypropylene formulations.

Ingredients Used to Prepare the Compositions

The materials used for preparing the polypropylene compositions are tabulated in Table 8.

TABLE 8

| Component (manufacturer) | GENERAL DESCRIPTION | FUNCTION |
|---|---|---|
| PP Capilene SL-50 (Caol) | polypropylene impact copolymer | plastic matrix |
| Product of Example 1 | Pentabromobenzyl-substituted polystyrene | FR |
| M0112 (Kafrit) | Antimony trioxide masterbatch which contains 80% by weight Sb$_2$O$_3$ | FR synergist |
| Talc MB (Kafrit) | Talc masterbatch of IOTALC | Filler |
| IOTALC | Talc powder | Filler |
| Irganox B 225 (Ciba) | 50% tris(2,4-ditert-butylphenyl)phosphite and 50% pentaerythritol tetrakis[3-[3,5-di-tert-butyl-4-hydroxyphenyl]propionate] | Antioxidant & heat stabilizer. |

Preparation of Polypropylene Compositions and Test Specimens

The ingredients were compounded in a twin-screw co-rotating extruder (Berstorff ZE25) with L/D=32. Temperature profile of 120-180-200-200-200-210-220-230° C. was employed. The screw speed was 350 rpm, and the feeding rate was 12 kg per hour.

The extrudates produced were pelletized in a pelletizer 750/3 from Accrapak Systems Ltd. The resultant pellets were dried in a circulating air oven at 80° C. for 3 hours.

The dried pellets were injection molded into test specimens using Allrounder 500-150 from Arburg according to the parameters set out in Table 9.

TABLE 9

| PARAMETER | UNITS | Set values |
|---|---|---|
| T$_1$ (Feeding zone) | ° C. | 210 |
| T$_2$ | ° C. | 215 |
| T$_3$ | ° C. | 220 |
| T$_4$ | ° C. | 225 |
| T$_5$ (nozzle) | ° C. | 230 |
| Mold temperature | ° C. | 35 |
| Injection pressure | bar | 1300 |
| Holding pressure | bar | 600 |
| Back pressure | bar | 60 |
| Holding time | sec | 7 |
| Cooling time | sec | 13 |
| Filling volume (portion) | ccm | 38 |
| Injection speed | ccm/sec | 35 |

The specimens were conditioned for one week at 23° C., and were then tested. The compositions and the results of the tests are set out in Table 10.

TABLE 10

| | Example | | |
|---|---|---|---|
| | 10 | 11 | 12 |
| Composition (by weight %) | | | |
| Polypropylene | 59.6 | 55.8 | 49.2 |
| product of Example 1 | 23.5 | 26.5 | 26.5 |
| Sb$_2$O$_3$ (as M-0112; containing 80% Sb$_2$O$_3$) | 6.7 | 7.5 | 7.5 |
| IOtalc | 10.0 | 10.0 | |
| Talc masterbatch | | | 16.7 |
| Irganox B 225 | 0.2 | 0.2 | 0.2 |
| Bromine content, % calculated | 16 | 18 | 18.0 |
| Antimony trioxide, % calculated | 5.3 | 6.0 | 6.0 |
| Talc, % calculated | 10 | 10 | 10 |
| Properties | | | |
| Flammability test: UL-94 vertical burning test at 1.6 mm thickness | | | |
| Maximal flaming time (sec) | 16 | 19 | 15 |
| Total Flaming time (sec) | — | 73 | 67 |
| Maximal glow time + second flaming | 0 | 6 | 28 |
| Number of specimen | 2 | 5 | 5 |
| Number of Specimens dripped | 2 | 5 | 5 |
| Number of cotton ignition | 2 | 0 | 0 |
| Rating | V-2 | V-1 | V-1 |
| Mechanical Properties | | | |
| Impact strength (J/m) | ND | 32 | 35 |
| Tensile strength (MPa) | ND | 21 | 18 |
| Elongation at break (%) | ND | 30 | 55 |
| Tensile modulus (MPa) | ND | 1924 | 1616 |
| Other properties | | | |
| HDT (° C.) | ND | 62 | 57 |
| MFI (g/10 min) | ND | 3.45 | 3.08 |

The invention claimed is:

1. A polymer comprising six-membered aromatic rings either as side chains or as a part of a backbone chain, wherein the polymer further comprises pendent —CH$_2$C$_6$Br$_5$ groups which are attached to at least a portion of said six-membered aromatic rings of the polymer, with a carbon ring atom of said six-membered aromatic ring being bonded to an aliphatic carbon of said —CH$_2$C$_6$Br$_5$ pendent group.

2. A polymer according to claim 1, represented by Formula I or II:

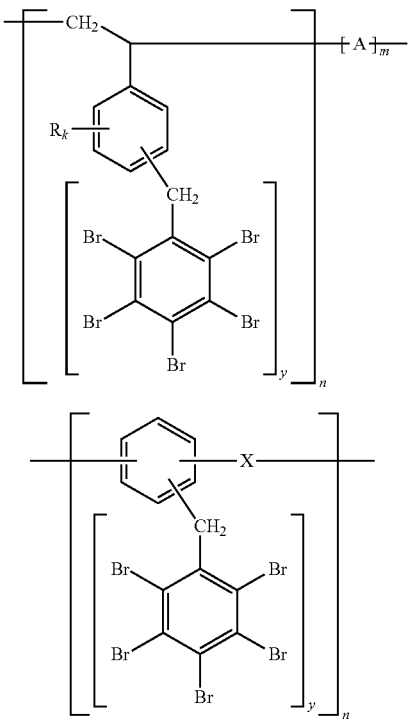

wherein in Formula I:
R is Br or a linear or branched aliphatic chain;
k is independently an integer from 0 to 4;
y is an integer from 1 to (5-k);
A is selected from the group consisting of null, —$CH_2CH_2$—, —$CH_2CH$=$CHCH_2$—, —$CH(CH_3)CH_2$—, and $CH_2$—$CH$=$C(CH_3)CH_2$—; and n and m are the number of repeat units in the polymer chain, wherein n≥3; and wherein in Formula II:
X is selected from the group consisting of null, O, S, $CH_2$, and —$CH_2CH_2$—; and
n is the number of units in the polymer chain, wherein n≥3.

3. A polymer of Formula I according to claim 2, which is pentabromobenzyl-substituted polystyrene.

4. A polymer of Formula II according to claim 2, which is pentabromobenzyl-substituted poly(phenylether).

5. A polymer according to claim 3, having bromine content of not less than 60% by weight.

6. A compound according to claim 4, having bromine content or not less than 70% by weight.

7. A flame-retarded composition, comprising a flammable material and the bromine-containing polymer according to claim 1.

8. A flame-retarded composition comprising a flammable material and a bromine-containing polymer, wherein the bromine-containing polymer is pentabromobenzyl-substituted polystyrene as defined in claim 5.

9. A flame-retarded composition according to claim 7, wherein the flammable polymer is polyamide.

10. A flame-retarded composition according to claim 7, wherein the flammable polymer is a polypropylene copolymer or impact modified polypropylene.

11. A flame-retarded composition according to claim 10, comprising 100 parts-by-weight polypropylene copolymer; from 5 to 50 parts-by-weight pentabromobenzyl-substituted polystyrene and from 2 to 20 parts-by-weight of antimony trioxide.

12. A flame-retarded composition according to claim 8, wherein the flammable polymer is polyamide.

13. A flame-retarded composition according to claim 8, wherein the flammable polymer is a polypropylene copolymer or impact modified polypropylene.

* * * * *